United States Patent
Gerhardt et al.

[11] Patent Number: 6,053,093
[45] Date of Patent: Apr. 25, 2000

[54] COFFEE ROASTER WITH ROASTING PROFILE CONTROL

[76] Inventors: Wayne Gerhardt, 4992 Fern Pl., Rehnert Park, Calif. 94928; Wayne Cook, 11750 Sutton St., St. Petaluma, Calif. 94952

[21] Appl. No.: 09/265,608

[22] Filed: Mar. 10, 1999

[51] Int. Cl.[7] .............. A23L 1/18; A23N 12/00; A23N 12/08; A47J 31/42; A47J 42/52

[52] U.S. Cl. .............. 99/331; 99/286; 99/323.5; 99/323.7; 99/348; 99/468; 99/476; 99/483; 34/233; 34/594

[58] Field of Search .................. 99/286, 323.5, 99/323.7, 331–334, 339, 340, 348, 467, 468, 473–476, 469, 483; 126/21 A, 369; 34/225, 233, 360, 368, 392, 394, 576, 594, 494, 499; 219/400, 502, 386, 385, 389; 366/292–296, 144–146

[56] References Cited

U.S. PATENT DOCUMENTS

| | | |
|---|---|---|
| 4,196,342 | 4/1980 | Chailloux ................... 219/385 |
| 4,325,191 | 4/1982 | Kumagai et al. ............ 99/286 X |
| 4,425,720 | 1/1984 | Elevitch .................... 219/386 X |
| 4,484,064 | 11/1984 | Murray ......................... 219/400 |
| 4,494,314 | 1/1985 | Gell, Jr. ......................... 99/323.7 |
| 4,860,461 | 8/1989 | Tamaki et al. ............ 99/286 X |
| 4,871,901 | 10/1989 | Igusa et al. ................... 219/400 |
| 5,269,072 | 12/1993 | Waligorski ..................... 34/594 |
| 5,359,788 | 11/1994 | Gell, Jr. .................. 99/323.7 X |
| 5,564,331 | 10/1996 | Song ............................... 99/469 |
| 5,609,097 | 3/1997 | Newnan .................... 99/483 X |
| 5,638,607 | 6/1997 | Lemme et al. ........... 219/385 X |
| 5,735,194 | 4/1998 | Cochran ......................... 99/483 |

*Primary Examiner*—Timothy Simone
*Attorney, Agent, or Firm*—Malcolm B. Wittenberg

[57] ABSTRACT

A device for roasting coffee beans in small quantities. The device includes a housing, coffee bean roasting basket, chaff collector, heater and fan to conduct the roasting operation. Thermosensors are located within the roasting basket whose output is provided to a microprocessor which, in turn, controls the roasting process by controlling roasting parameters.

16 Claims, 10 Drawing Sheets

THERMOSENSOR LEADS

COFFEE ROASTER WITH ROASTING PROFILE CONTROL

TECHNICAL FIELD OF INVENTION

The present invention relates to an improved coffee roaster. The invention is ideally suited for roasting small batches of coffee beans which is capable of roasting the beans by controlling parameters of the roasting process to achieve results as good or superior to results achieved by commercial roasters.

BACKGROUND OF THE INVENTION

There is little doubt that the brewing of freshly roasted coffee is superior to the brewing of coffee from beans which have been roasted well in advance of the consumption of the coffee product. For example, U.S. Pat. No. 4,196,342 notes that for coffee to have all its flavor, it should be consumed less than eight to ten days after it has been roasted. There is a further recognition that when coffee is roasted in a commercial shop, it is often roasted well in advance of its sale date resulting in the consumption of a less than ideal product.

Although coffee roasting is obviously conducted commercially, there has been limited success enjoyed by those wishing to roast coffee beans in small batches, for example, in homes or in coffee shops. The lack of universal success of small batch roasting stems primarily from the failure of the prior art to recognize the criticality that seemingly minor variations in the roasting process has in affecting the discernable characteristics of the final coffee product.

Virtually all small batch roasting devices have proven unsatisfactory because, in an effort to create a simple non-complex device, little or no attention has been given to the control of the coffee roasting process. Most small batch roasters simply provide for the capture of green beans and for the roasting of the beans at a predetermined temperature for a predetermined period of time whereupon the roasting process would end. Simplistic devices of this nature fail to recognize that the coffee roasting process is complex and that a successful roast should ideally monitor and control bean temperature and type to create a time/temperature profile to optimize roast performance for each bean type. The ideal roaster must have the capability of controlling all phases of the roasting process from an initial heat cycle through completion of cooling. The present device can account for a number of variables including the bean type, quantity of beans being roasted in a given cycle, initial bean temperature and the bean water content.

The present invention recognizes that an experienced coffee drinker can readily detect the difference between a coffee roasted at, for example, 435° F. and one roasted at 445° F. In other words, slight differences in the degree of roast are discernable. In addition to this, and by way of example, a coffee brought abruptly to a temperature of 445° F. and then rapidly cooled, can be discerned as having a different set of taste characteristics than the same coffee beans being slowly brought up to the same temperature of 445° F. and cooled identically. As such, varying heat profiles can also greatly affect the final result. Abrupt and rapid cooling down to room temperature at a precise point in the roast cycle is necessary to halt the roast process and lock in certain characteristics at that point. Even the speed with which the cooling process takes place can greatly affect the final result, since it is readily halting the chemical pyrolysis underway in the bean at a certain point.

It is thus an object of the present invention to provide a small volume roaster which is capable of being preprogrammed for multiple standard roasts allowing for variability in each roast to achieve infinite reliability yet optimized roast characteristics.

It is yet a further object of the present invention to provide for a small volume coffee bean roaster with the capability of controlling various factors including the degree of roast and rate of roast, taking into account only the bean type and virtually eliminating other variable effects.

It is yet a further object of the present invention to provide a small batch roaster intended for home use which provides for manual operation to enable a roaster with sufficient knowledge and judgment to control the roasting process while bypassing the microprocessor control parameters otherwise available.

It is yet a further object of the present invention to provide a small batch roaster for home use which is customizable allowing a user to program various options in order to personalize roasting characteristics.

These and further characteristics of the present invention will become more readily apparent when considering the following disclosure and appended claims.

SUMMARY OF THE INVENTION

The present invention is directed to a device for roasting coffee beans in small quantities comprising a housing including a main body and a top. The housing contains and supports a coffee bean roasting basket for retaining the coffee beans during roasting. A chaff collector is located beneath the roasting basket for collecting chaff produced during the process of roasting the coffee beans, the chaff collector being removable from the housing for emptying chaff accumulating during the roasting process. Heaters are located proximate the roasting basket for the transfer of heat energy to the coffee beans during the roasting process.

The operation of the heater as well as other process parameters are controlled by a microprocessor which is designed to receive temperature readings from thermosensors located within and exterior to the coffee bean roasting basket. The thermosensors are intended to accurately read the temperature of the beans themselves and the surrounding temperature and provide this information to the microprocessor. The microprocessor further is intended to receive elapsed roasting time values during the roasting process and is able to control the roasting process as a consequence. The microprocessor can be empirically programmed with roasting profiles depending upon bean type and degree of roast for selection by a user.

DETAILED DESCRIPTION OF THE INVENTION

Figure 1:
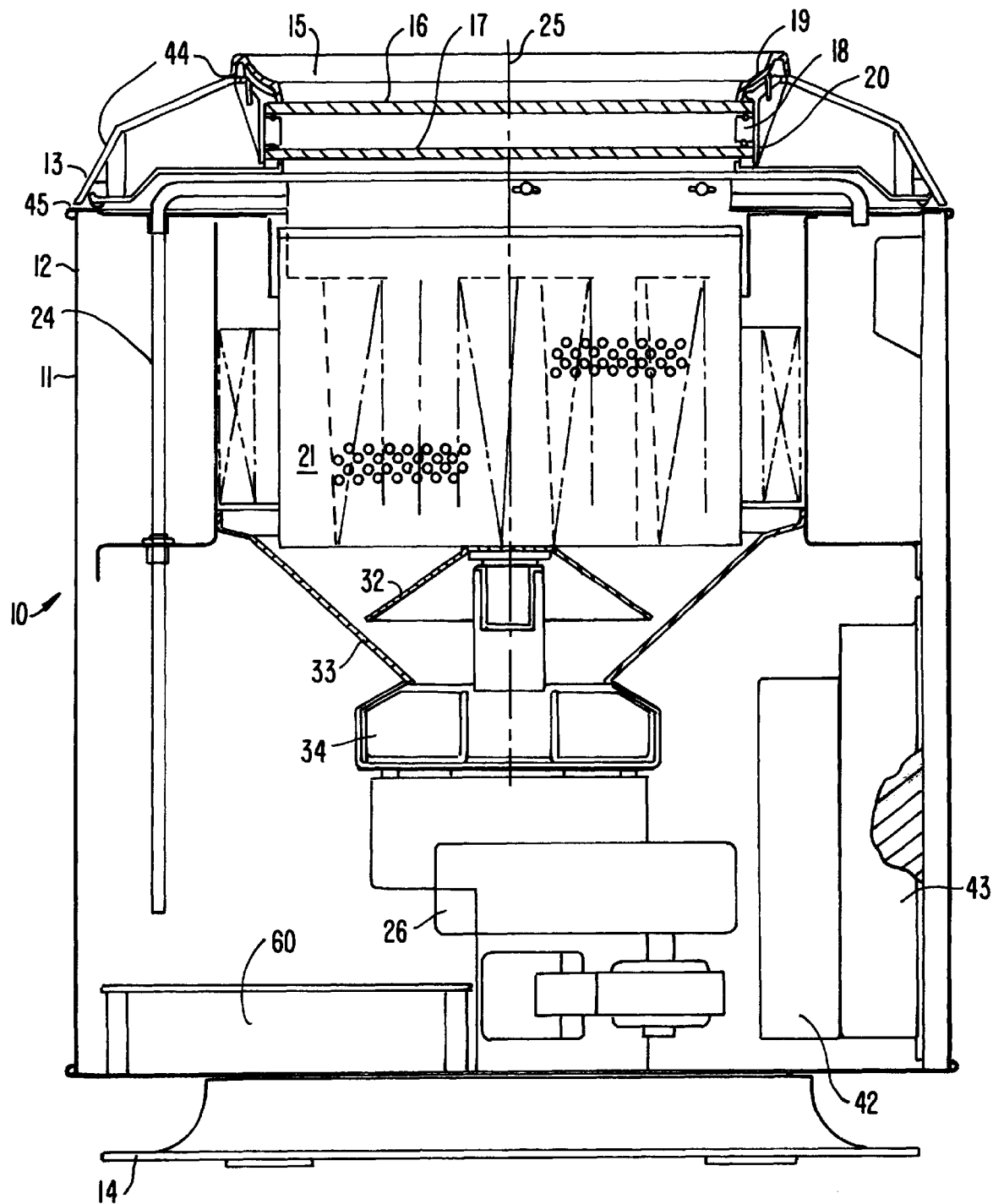
FIG. 1 is a front cross-sectional view of the coffee bean roaster of the present invention.

Turning first to FIG. 1, coffee bean roasting device 10 is depicted in front cross-sectional view in order to provide the viewer with various internal components of the present invention. Specifically, housing 11 in the form of, for example, a molded plastic body, is provided as main body 12 and top 13. For aesthetics and convenience, housing 11 can be supported on a horizontal surface by base 14.

Figure 2:
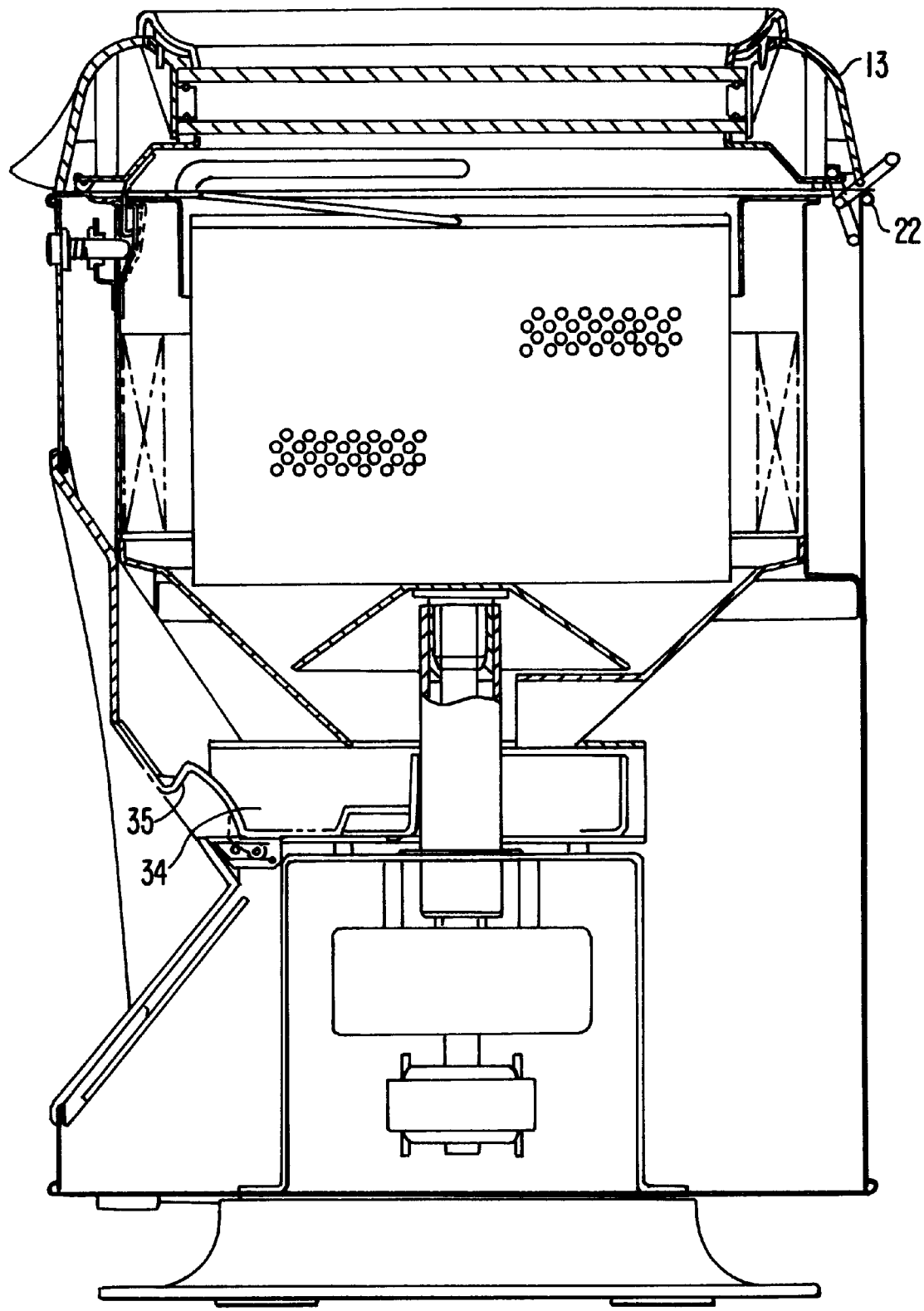
FIG. 2 is a cross-sectional side view of the coffee bean roaster of the present invention.

Top 13 is provided with opening 15 which has been fitted with glass elements 16 and 17 maintained in horizontal parallel alignment by spacer 18 and O-rings 19 and 20. With such a configuration, a user can examine beans being roasted within roasting basket 21 without having to swing top 13 open along hinge 22 (FIG. 2). Openings 44 allow for venting of the top 13.

Figure 5:
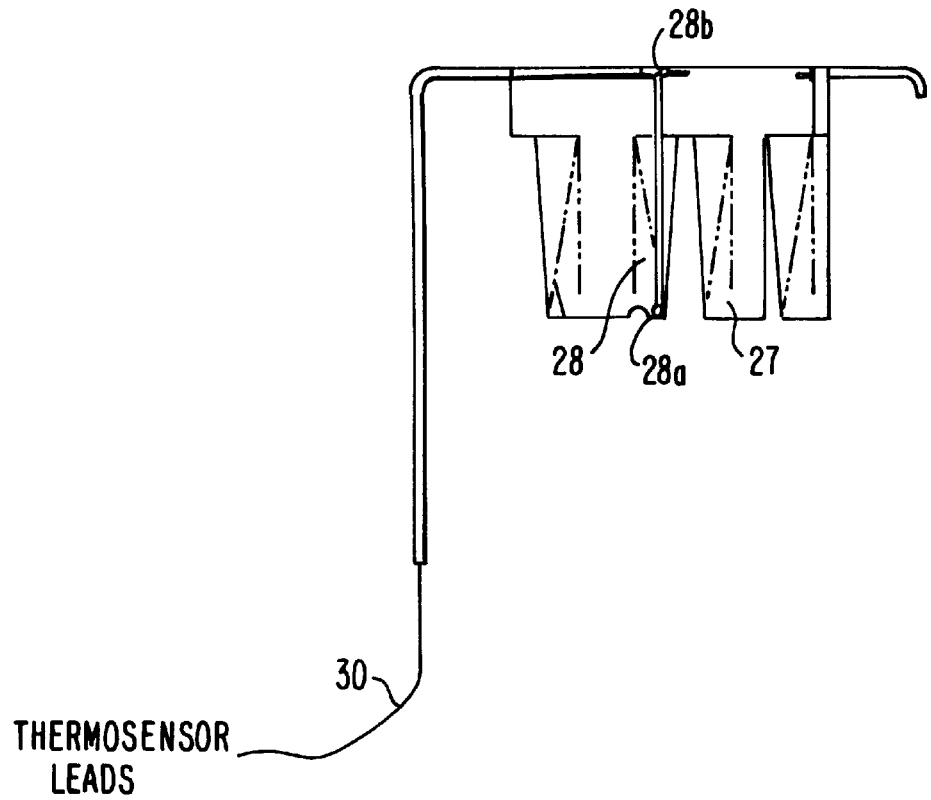
FIG. 5 is a plan view of the dasher, dasher blades and thermosensors used in the present invention.

In operation, a quantity of coffee beans are provided to roasting basket 21 once top 13 has been fully swung open. Top 13 is closed after dasher 24 positioned. As the roasting process commences, roasting basket 21 rotates along vertical axis 25 through the operation of motor assembly 26. As shown in FIG. 5, dasher 24 is connected to a series of blades 27 which remain stationary but which mix beans contained within rotating basket 21 to maintain a uniform constant temperature. As further shown in FIGS. 5, thermosensors 28 having sensor end 28a and optional sensing end 28b which emanate from dasher 24 within and exterior to rotating basket 21. Such an arrangement provides a highly effective means of measuring uniform bean temperature through the immersed thermosensors such as thermocouple end 28a as well as optionally the chamber temperature through thermocouple sensing end 28b. As such, the bean temperature as a function of time can be fed to the microprocessor for control of the roasting operation. Further, chamber temperature can be a valuable information component. For example, if the chamber temperature was to exceed a preprogrammed threshold value by virtue of, for example, the initiation of a fire, extinguishing procedures can be automatically imposed for safety.

The heating of beans within roasting basket 21 with plurality of holes is carried out by virtue of heating elements 31. Again, as will be more thoroughly discussed below, the control of heating elements 31 can be conducted via microprocessor 60 being preprogrammed and being fed real time bean and ambient temperatures via thermosensors 28. Heat from heating element 31 is uniformly maintained in the rotating basket 21 via inner heat deflector cone 32.

Figure 3A:
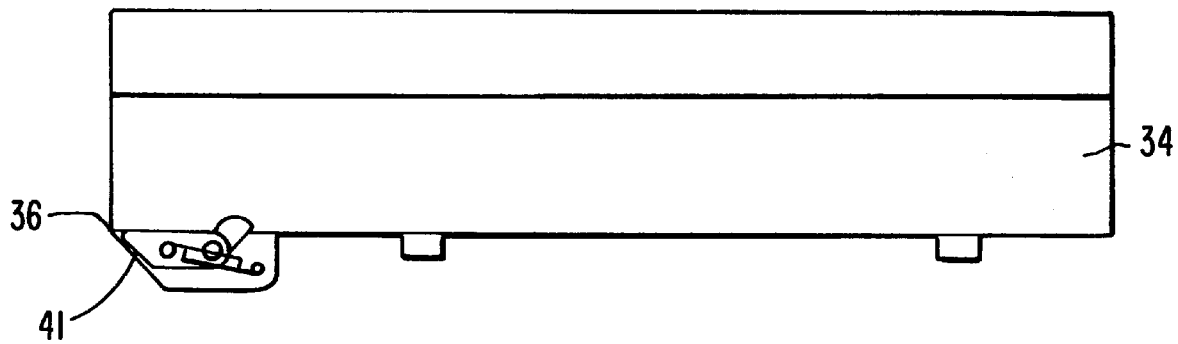
FIGS. 3a and 3b are side views of the latch mechanism employed on the chaff tray of the present invention.
Figure 3B:
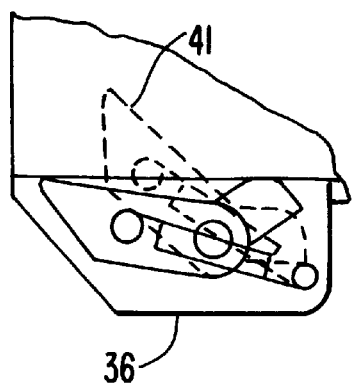

Chaff is a natural product of any bean roasting operation. It is contemplated in practicing the invention that chaff would drop from rotating basket 21 past inner heat deflector cone 32 and cascade over outer heat deflector cone 33 to be collected within chaff collection tray 34. In operation, reference is made to FIGS. 2, 3a and 3b. Specifically, chaff collection tray 34 can be withdrawn from housing 11 by finger grip indent 35. The tray is intended to be completely removable from the device of the present invention whereupon the chaff can be disposed of by simply inverting the tray into a suitable waste collector. As a preferred embodiment, it is contemplated that a safety feature be configured as part of the chaff tray ensuring that the chaff is disposed of between roast runs. As an example of such a safety feature, it is contemplated that a spring loaded safety latch shown collectively as element 36 is employed so that a coffee bean roast cannot be initiated unless chaff from a prior roast has been disposed of. In this regard, reference is made to FIGS. 3a and 3b where, in FIG. 3a, latch 41 is shown in a depressed position while chaff collection tray 34 is installed within the device. Once chaff collection tray 34 has been removed, latch 41 rises as a result of it being spring-loaded. Upon its reinsertion into the device, microprocessor 60 is free to initiate a subsequent roast. Once center latch 41 is depressed back to its load position as shown in FIG. 3a, again, enabling the device of the present invention to operate.

In further operation, fan 42 is placed within housing 11 as shown in FIG. 1 proximate exhaust filter 43. When operating, fan 42 draws ambient air through openings 45 created between top 13 and main body 12. Air so drawn by fan 42 proceeds both through coffee bean roasting basket 21 to controllably cool the beans at the appropriate time during the roasting process as well as around bean roasting basket 21 and over motor 26 as a cooling expedient. Filter 43 filters virtually all smoke and effluent emanating from the present device. As a preferred embodiment, the present invention contemplates the use of a two-speed fan having a low speed for drawing smoke and chaff from beans roasting within rotating basket 21 during roasting and a high speed for cooling the beans and further drawing smoke and chaff from the roast during cool down.

Figure 4A:
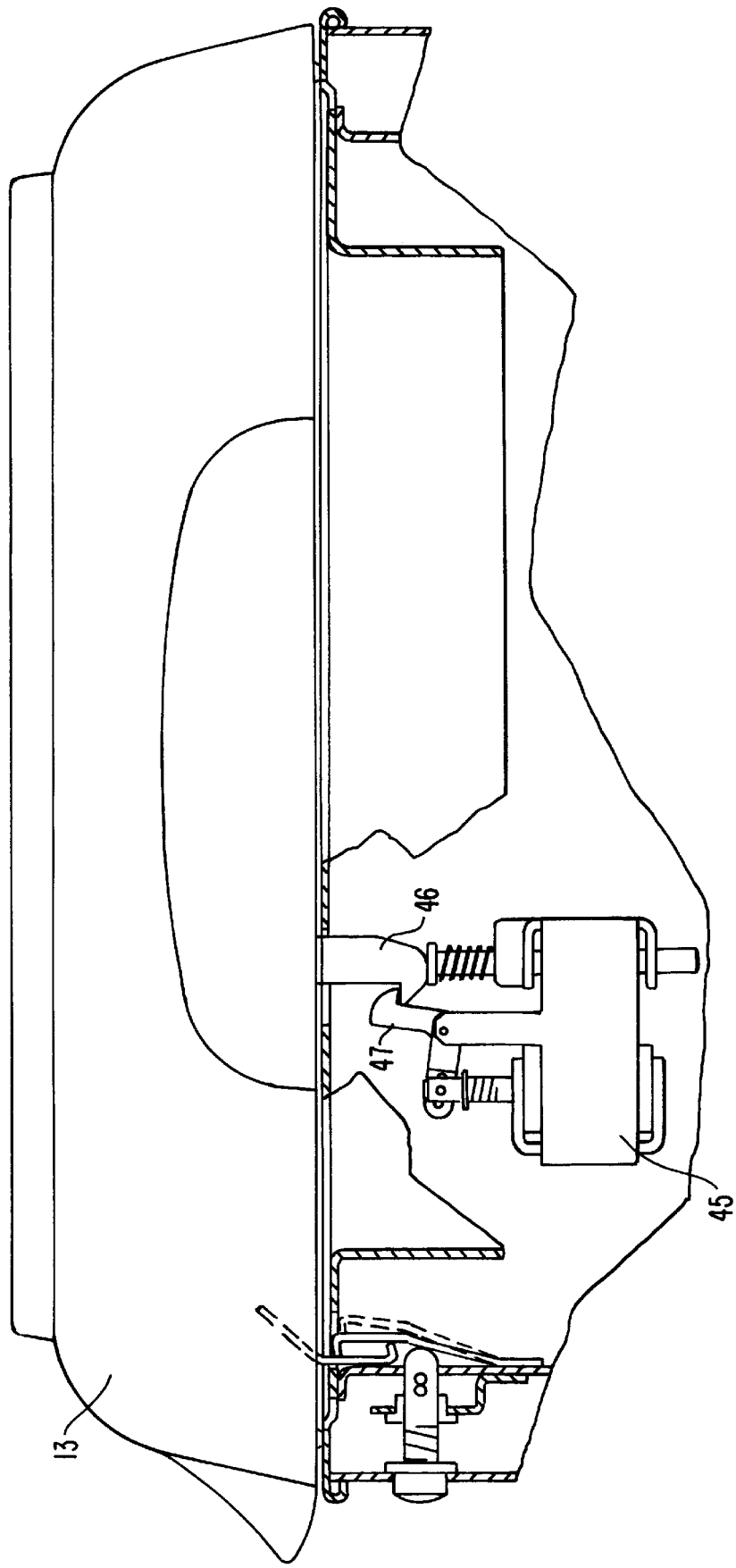
FIGS. 4a, b and c are detailed side views of latching mechanisms for retaining the top to the main body of the present device.
Figure 4B:
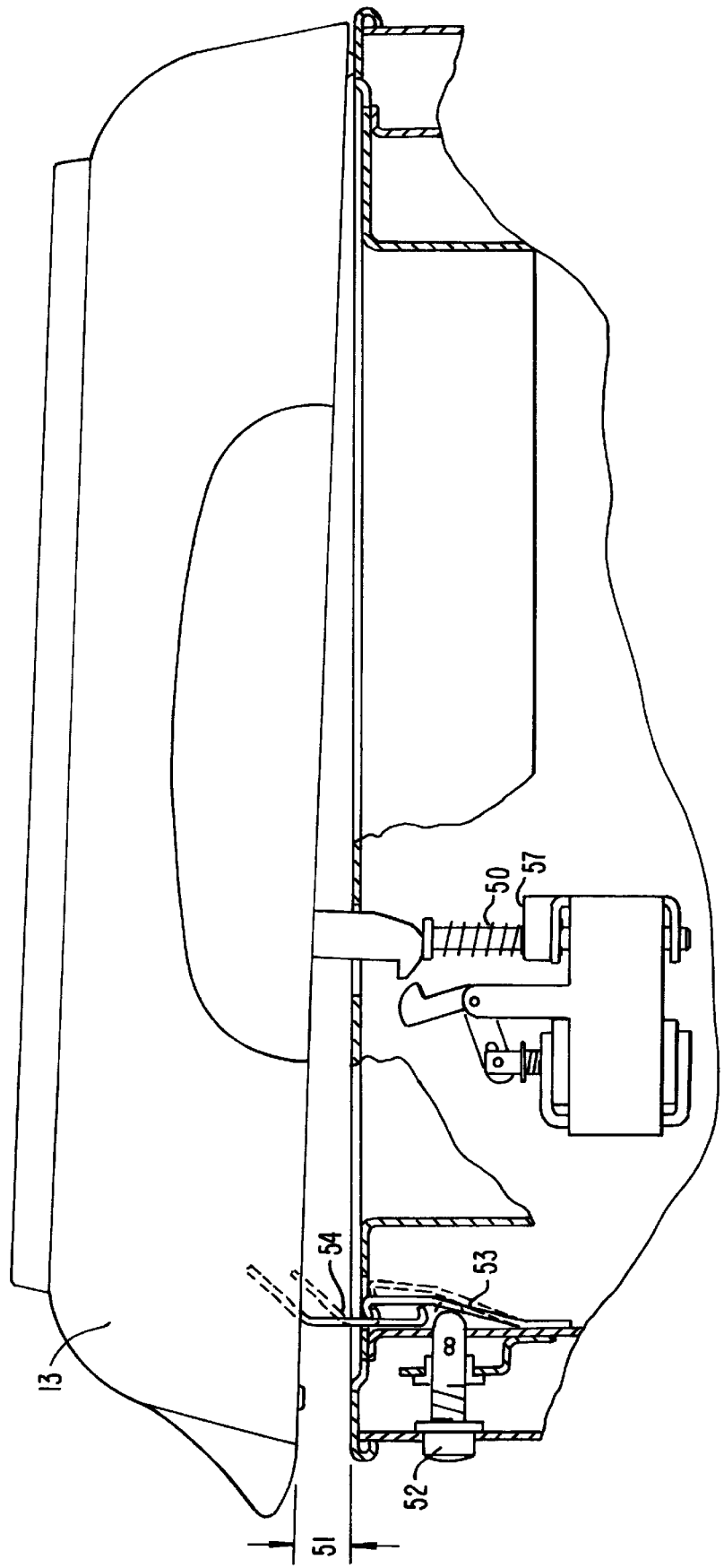

As a further preferred embodiment, top 13 hinged at 22 is capable of assuming several orientations in the practice of the present invention. As noted previously, during the bean roasting process, top 13 is caused to seat upon main body 12 maintaining appropriate bean roasting temperatures within the device. When loading and unloading beans, however, top 13 can swing around hinge 22 to present a wide mouth opening exposing the entirety of bean roasting basket 21. However, there is an intermediate opening orientation for top 13 which will be discussed in reference to FIGS. 4a, 4b and 4c. Regarding FIG. 4a, top 13 is shown in its closed orientation, that is, the orientation normally assumed during the bean roasting process. To prevent lid 13 from opening, solenoid 45 is provided and controlled by microprocessor 60 (FIG. 1). In this orientation, latch arm 46 is captured by engagement arm 47 preventing top 13 from opening. However, when microprocessor 60 either signals the end of the roasting process or dictates that top 13 be immediately opened to quench the roasting process, immediately solenoid 45 causes disengagement of engagement arm 47 from latch arm 46 whereupon biasing spring 50 pushes upon latch arm 46 raising top 13 from its seated position creating gap 51 as shown in FIG. 4b.

As noted previously, top 13 can take on several orientations, specifically, a first orientation in which top 13 is seated upon main body 12 (FIG. 4a), a second in which top 13 is spaced from main body 12 by a gap 51 (FIG. 4b) and a third in which top 13 is swung completely open to remove beans once roasted. FIG. 4b further shows a safety device preventing the unintentional opening of the top. In this preferred embodiment, depression latch 52 is caused to abut first capture arm 53 which, in turn, hooks upon second capture arm 54. The engagement of capture arms 53 and 54 prevents top 13 from opening any wider than gap 51 unless depression latch 52 is depressed causing first capture arm 53 to assume its phantom orientation.

Figure 4C:
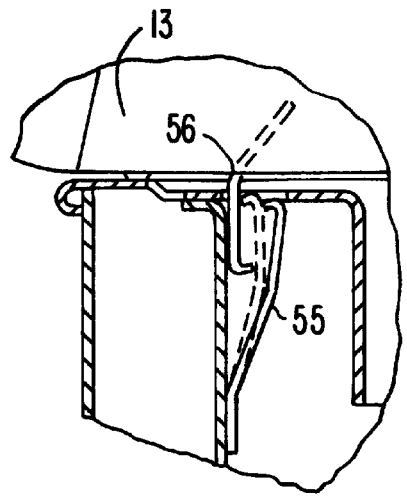

FIG. 4c illustrates yet a further embodiment of a safety latch contemplated in practicing the present invention. In this instance, as in the embodiment shown in FIG. 4b, first and second capture arms 55 and 56 are shown in an abutting relationship preventing top 13 from fully opening. However, in this embodiment, capture arm 55 comprises a bimetallic strip which closes once temperatures reach a predetermined threshold value of, for example, 600° F. At that point, it is impossible to swing top 13 from main body 12 beyond the distance provided by capture arms 55 and 56 until the interior of the device cools. The above is an illustration of one means of providing a safety latch as others, not specifically described herein and which would be obvious to those skilled in this art are intended to be included in the present disclosure.

As yet a further safety feature, as a preferred embodiment, it is contemplated that low melting point metallic spacer 57 (FIGS. 4a and 4b) be employed upon solenoid 45 to support biased spring arm 50. In the event of a fire, element 57 would melt collapsing spring arm 50 and allowing top 13 to seat upon main body 12 by gravity. This would limit oxygen intrusion to the interior of the device helping to quench a fire if a malfunction occurs.

As noted previously, the present invention provides for the precise control of the bean roasting process through the use of microprocessor 60. The microprocessor captures the bean temperature as a function of time to continuously adjust heater power to maintain an exact desired bean temperature from start to finish. As a preferred embodiment, as will be more thoroughly discussed below, the bean temperature is compared to a roast profile of bean temperature versus time for a particular desired roast. The bean temperature can then be adjusted continuously to keep the actual bean temperature precisely on the desired roast profile. As such, each run of a particular desired roast experiences the same temperature profile irrespective of the many variables which affect the actual roast achieved. If these variables are not kept consistently the same from roast to roast, then the resulting roast may vary significantly from one batch to the next. Through the practice of the present invention, variables including the quantity of beans being roasted, their density, moisture content, age and initial temperature as well as the internal temperature and pressure of the roaster, its humidity and atmospheric pressure can be automatically compensated for in the practice of the present invention by precise bean temperature profiling.

Figure 6:
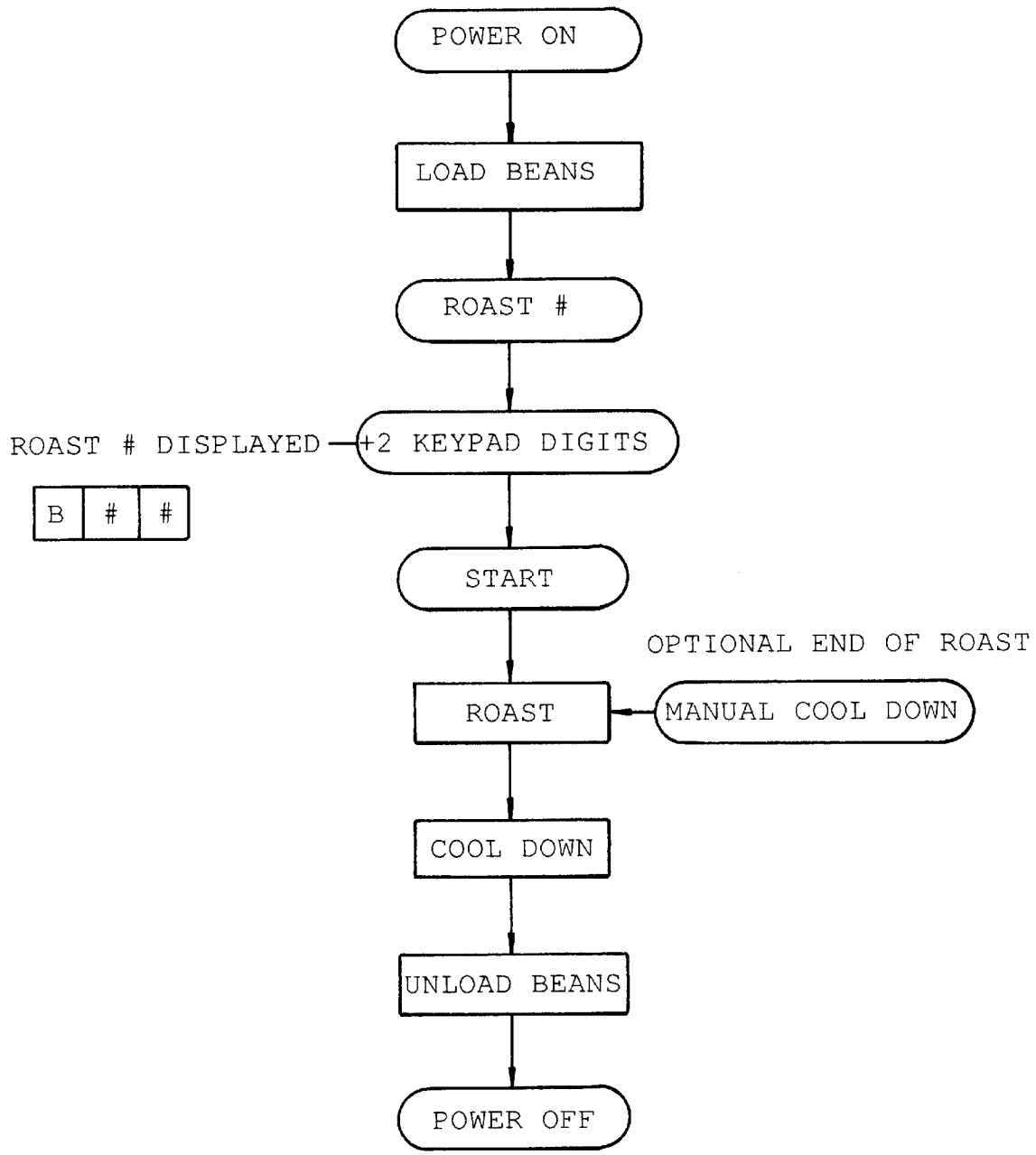
FIG. 6 is a flow diagram of the roasting functions to conduct a basic roast employing the present invention.

FIG. 6 is directed to a flow chart showing the basic operation of the present device. Once the device has been powered, beans are loaded within roasting basket 21. A specific roasting profile can be selected from preprogrammed roasting profiles and a program number entered by a keypad configured within housing 11. A start button is then depressed and the roasting process commenced. The process can either continue until the preselected program has been run or manually terminated. Cool down is achieved with top 13 automatically disengaged from main body 12 creating gap 51 as shown. Once cool down has been completed, the roasted beans can be removed.

Figure 7:
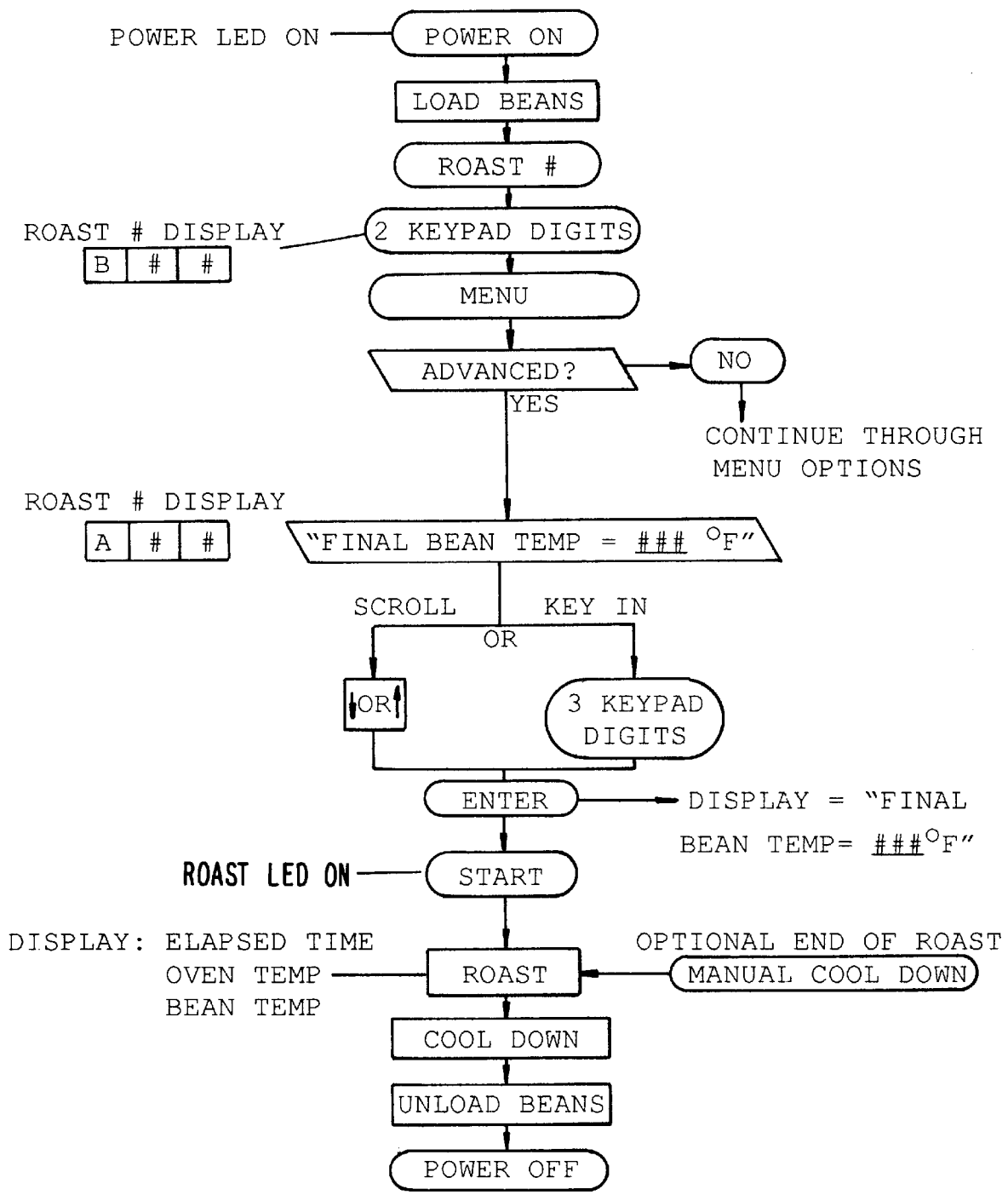
FIG. 7 is a flow diagram of an advanced roasting protocol employing the present invention.
Figure 8:
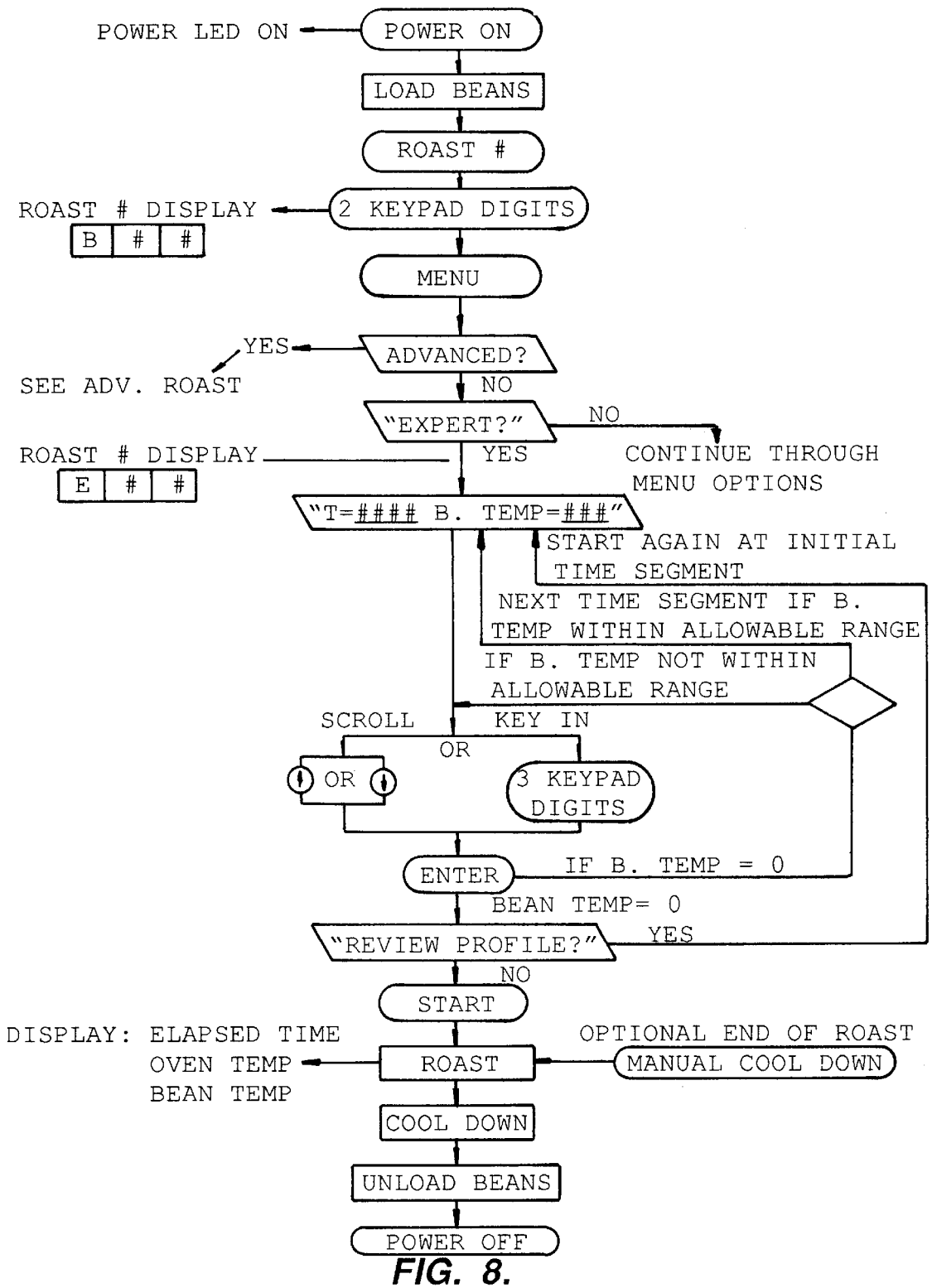
FIG. 8 is a flow diagram of an expert roasting protocol employing the present invention.

Once a user is ready to control the roasting process by introducing variables beyond the basic roasts, an advanced roast profile can be selected as illustrated in the flow diagram of FIG. 7. In fact, the present invention contemplates a number of alternatives. Specifically, one can engage the device to conduct a basic roast which indicates that the device is to carry out a preprogrammed profile for a specific type of bean, which includes a preprogrammed degree of roast. One can move on to an advanced roast which, in effect, fine tunes the degree of roast to values between the basic roast values. One could then move on to conduct an expert roast which provides the further control of the process. The expert roast allows for infinite adjustments of both degree of roast and the roasting profiles. Those adept in conducting coffee bean roasts can alternatively engage a manual roast cycle by inputting a basic roast number and then running the device until one would elect to manually initiate manual cool-down. Previous roasts can be maintained in memory by time and date or by virtue of a saved program number. Thus, a user could access previously saved data particularly if a roast previously carried out provided characteristics to the roasted coffee beans which a user wished to emulate. The device also provides for a programmed start and delayed start programs enabling the device to automatically turn on without human intervention. In doing so, a user obviously has the opportunity to program dates and times within the microprocessor for later access.

Turning once again to FIG. 7, as with the flow diagram of FIG. 6, once the device has been powered, beans are loaded and a roast profile can be selected from a preprogrammed menu of roast options. In this instance, however, instead of simply commencing the roast cycle, a user can enter a menu providing the option to engage an advanced roasting cycle. If the advanced roast cycle is not selected, the user can continue through menu options. However, if it is selected, the user, in selecting the advanced mode, can enter one's own final bean temperature and then simply initiate the selected roast process allowing the device to go through its roast and cool-down cycles prior to unloading the beans once roasted. Selection of final bean temperature will change the degree of roast.

If a user decides to select the expert roasting cycle, the user is displayed the roast profile previously selected and is provided the opportunity to scroll through the time/temperature profile which can be manually changed by the user in the expert mode for each time segment of the profile until the end of the roast is achieved. Once this is done, the user will depress the "start" button to begin the roast at the user's revised profile.

Figure 9:
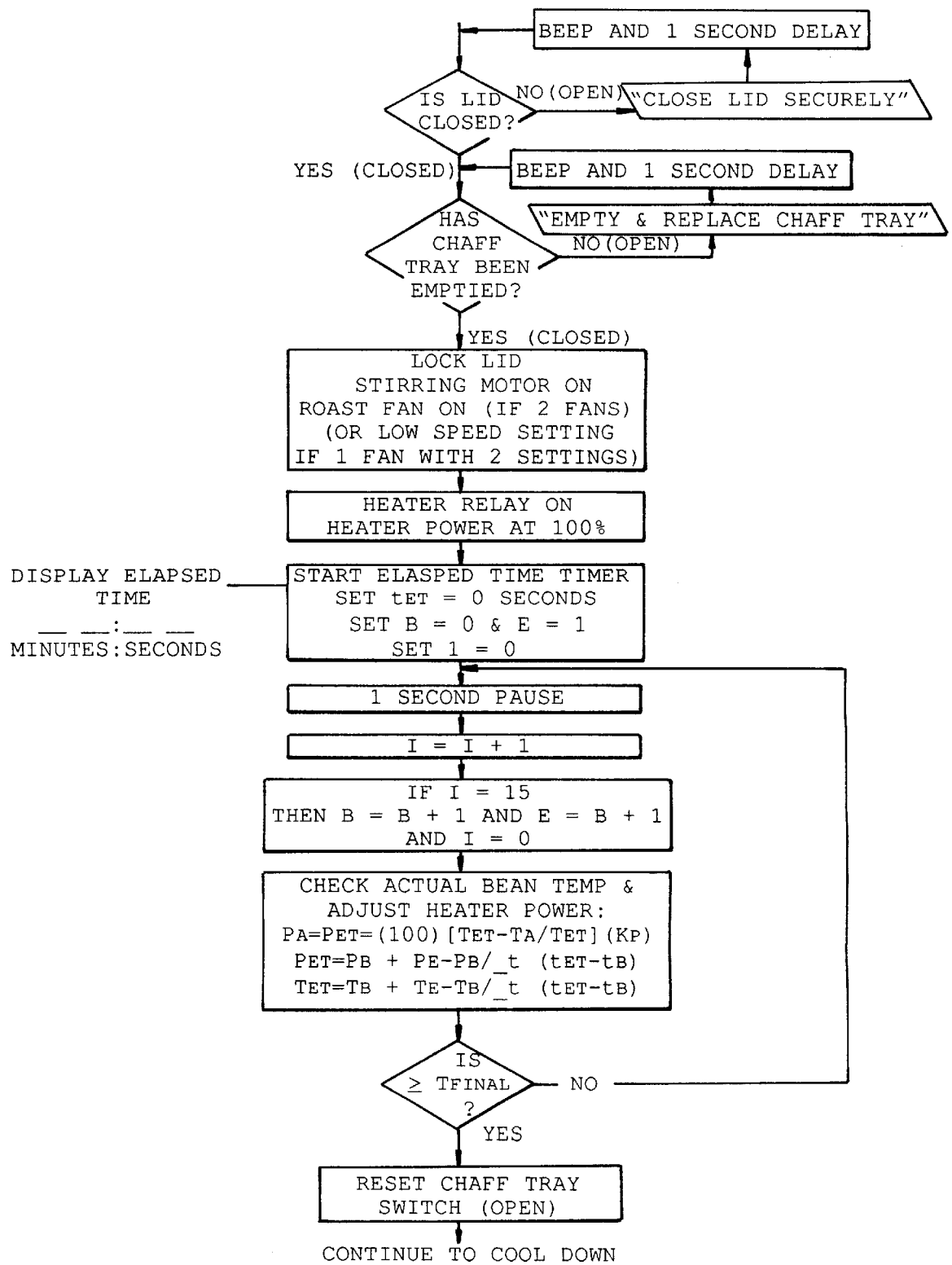
FIG. 9 is a partial flow diagram showing typical parameters measured for the microprocessor and typical equations programmed for the microprocessor to control a roast pursuant to the present invention.

Turning to FIG. 9, the basic operation of the present invention as impacted by microprocessor 60 is depicted. The flow diagram of FIG. 9 begins once the beans to be roasted have been fed to roasting basket 21. As noted previously, as a preferred embodiment, operation of the present device will not commence until there has been confirmation that chaff tray 34 has been emptied and reinstalled. There is then required confirmation that the lid has been locked whereupon motor 26 commences rotation of basket 21 and fan 42 begins drawing ambient air through the device as described above.

Microprocessor 60 then commences on an elapsed time counter beginning at $t_{et}$ (elapsed time) equal to zero seconds. Counters are then commenced with B (beginning of a time segment) equal to zero and E (end of a time segment) equal to one and I a variable set at zero.

A number of time/temperature profiles can be employed in the programming of microprocessor 60 so that a user can select the degree of roast to achieve desired bean characteristics. For example, the microprocessor can be programmed for bean temperatures and power levels at 15 second intervals and adjust the power to heating elements 31 depending upon whether the bean temperature at a specific time segment is greater or less than the profile temperature programmed into the microprocessor. As an illustration, power to the heating elements 31 can be adjusted according to the following equations:

$$P_A = P_{ET} + (100)\left[\frac{T_{ET} - T_A}{T_{ET}}\right](K_P)$$

$$P_{ET} = P_B + \frac{P_E - P_B}{t}(t_{ET} - t_B)$$

$$T_{ET} = T_B + \frac{T_E - T_B}{t}(t_{ET} - t_B)$$

wherein $P_A$=the actual adjusted power at $T_{ET}$ to be delivered to the heaters $P_{ET}$=the power output at the elapsed time per roast profile table $P_B$=power at the beginning of a time segment $T_{ET}$=temperature per roast profiled any elapsed time $T_B$=the temperature at the beginning of a time segment per roast profile, for example, $T_O$=the temperature x0, $T_3$=temperature at time segment 3 which corresponds to the time being 45 seconds using 15 second time segments.

$P_E$ is the power at the end of any time segment $T_A$ is the actual bean temperature $t_{ET}$=elapsed time $t_B$=the time at the beginning of a time segment $t_E$=the time at the end of the time segment $K_P$ is a power adjustment constant which is empirically derived. $K_P$ is preset at the factory for the specific roaster's characteristics. Depending upon the variables discussed above, the constant can have various values under various operations.

Alternatively, one could use PID (Proportional, Integral and Derivative) control technology to proportionally adjust heater 31 or other standard temperature control technologies.

As noted above, the present invention is capable of controlling minutely the small variables that greatly affect the final result when roasting coffee. In operation, lid 13 is initially swung open by rotation over hinge 22 and a desired amount of green coffee beans are poured into roasting basket 21 and lid 13 shut.

A control panel is then accessed to provide for commencement of the roasting process as described above. At that time, roasting basket 21 starts to revolve at a rate of about 15–40 rpm and heating elements 31 are activated. Microprocessor 60 controls the heating elements in response to data being input both ends 28a and 28b of thermosensors 28 (FIG. 5) which provides actual bean temperature surrounding interior and temperature of the chamber. Continuously, while this process of roasting is taking place, exhaust fan 42 running at a low rate is employed to purge any smoke through filter 43. This is done by means of air current at a low rate through openings in the lid and at the interface between the lid and main body 12. Air so drawn is directed through and around roasting basket 21, down through heat deflector cones 32 and 33 and down through removable chaff tray 34 which has a screen bottom designed to catch the chaff and on down to exit through the two-speed fan 42 and smoke and odor filter 43. This low speed continuous air flow has the effect of evacuating any smoke which may develop during the roasting process. Microprocessor board 60, and the control panel and motor 26 are shielded from excess heat vented by convection to ambient air.

As the beans begin to go through the roast process, the chaff begins to loosen from the beans and this chaff is then somewhat pulverized by stirring dasher fingers 27 (FIG. 5). The chaff so pulverized subsequently falls through holes in the bottom of roasting basket 21 and slides down through and over deflector shields 32 and 33 coming to rest in chaff tray 34.

At the end of the roasting cycle after the programmed profile has been accomplished, heating elements 31 are shut down, solenoid 45 actuates to release the latch causing lid 13 to swing from main body 12 a predescribed distance 51 and fan 42 is caused to run at a high speed to rapidly cool down the beans by directing air flow to rotating basket 21 as dictated by the internal geometry of the device. Once sensors have determined that the beans and chamber temperature have cooled a sufficient degree, the fan terminates its operation, the lid being free to swing open as the roasting basket stops rotating. The stirring dashers can then be elevated and swung to one side exposing the roasted beans within basket 21.

Stirring dashers 27 are provided with fingers (FIG. 5) that are angled in form and are intended to continuously stir the beans while roasting basket 21 is revolving. These fingers move the beans from outside of the basket to the inside, from the bottom to the top, thus ensuring a uniform exposure to heat and ensuring a uniform degree of roast to all of the beans in the basket. The thermosensor is fixedly mounted to the stirring dasher as shown in FIG. 5 and thus stays with it. As noted, thermosensor tip 28A is mounted in such a way that it is immersed in the beans and has direct contact with the beans at all times, thus closely monitoring the actual bean temperature continuously. The chamber temperature thermosensor tip 28b monitors chamber temperature continuously as well.

It is contemplated in the practice of the present invention that a user of this device can, to a degree, manually control the roasting process. Specifically, it is contemplated that once the user has selected the manual mode and a preprogrammed roast profile, the roast can be terminated by the user at a selected time and temperature. This is known as the "manual option."

It is further contemplated that microprocessor 60 is to contain a safeguard function that prevents the unit from exceeding desirable temperatures in which case it will immediately cause a complete shut-down, including non-release of lid 13, terminating power to heaters 31 and thus suffocating any potential fire and confining it in an oxygen-deprived atmosphere.

While preferred embodiments have been shown and described, it will be understood that they are not intended to limit the disclosure but rather are intended to cover all modifications and all alternative methods falling within the spirit and scope of the invention as defined in the appended claims.

we claim:

1. A device for roasting coffee beans in a highly controlled environment comprising a housing, including a main body and a top, said housing containing and supporting a coffee bean roasting basket for retaining the coffee beans during roasting, a chaff collector located beneath said roasting basket for collecting chaff produced during the process of roasting the coffee beans, said chaff collector being removable from said housing, a heater located proximate said roasting basket for the transfer of heat energy to said coffee beans during the roasting process, the operation of said heater being controlled by a microprocessor, conical heat shields to direct air flow, deflect heat and facilitate chaff collection, a fan for drawing air from outside of said housing through vents in said housing and for discharging said air through an exhaust filter located in a side wall of said housing, a stirring dasher for stirring said beans within said roasting basket during the coffee bean roasting process, a thermosensor immersed in the coffee beans contained within the roasting basket for detecting coffee bean temperature during the roasting process, and a microprocessor for receiving temperature readings from said thermosensor and elapsed time values during which the roasting process has been carried out for controlling parameters of the roasting process.

2. The device of claim 1 wherein the microprocessor is employed to control the operation of said heater.

3. The device of claim 1 wherein the control of the parameters by said microprocess is a further function of the nature of the coffee beans being roasted.

4. The device of claim 1 wherein the operation of said fan is further controlled by said microprocessor.

5. The device of claim 1 wherein the operation of said microprocessor can be intermittently terminated providing for manual control of said roasting.

6. The device of claim 1 wherein said air drawn from outside of said housing is drawn through said roasting basket.

7. The device of claim 1 wherein said air drawn outside of said housing is drawn through and around said roasting basket and over said motor.

8. The device of claim 1 wherein said top is hingedly connected to said main body and is seated to said main body during roasting but swingable from said main body before and after roasting.

9. The device of claim 8 wherein said top and main body are latched so that said top is only partially swingable from said main body without actuation of a manual release.

10. The device of claim 8 wherein said top and main body are latched by a temperature sensitive latch so that said top is only partially swingable from said main body if the temperature of said device is greater than a predetermined temperature.

11. The device of claim 8 wherein a safety latch is provided between said top and main body so that in the event that temperatures within said device exceed a predetermined value, said top will seat upon said main body.

12. The device of claim 1 wherein a coffee bean roast will be prevented unless said chaff collector has been removed from and reinserted into said main body for disposing of chaff from a prior roast.

13. The device of claim 1 wherein said microprocessor is programmed with at least one time/temperature roasting profile selectable by a user to control bean temperature as a function of time throughout the roasting process.

14. The device of claim 13 wherein said microprocessor is programmed with at least two time/temperature roasting profiles enabling a user to select between different roasting profiles which, in turn, would dictate the degree of roast of the beans.

15. The device of claim 13 wherein a user can view the time/temperature roasting profile and alter the profile to change the bean temperature as a function of time during the roasting process.

16. The device of claim 13 wherein a user can alter the final temperature and roast time of a time/temperature roasting profile to alter the degree of roast from that which was dictated by the time/temperature roasting profile.

* * * * *